United States Patent
Lee et al.

(10) Patent No.: US 9,143,680 B2
(45) Date of Patent: Sep. 22, 2015

(54) EVENT-BASED IMAGE PROCESSING APPARATUS AND METHOD

(71) Applicant: SAMSUNG ELECTRONICS CO., LTD., Suwon-si (KR)

(72) Inventors: Kyoobin Lee, Seoul (KR); Hyun Surk Ryu, Hwaseong (KR); Jun Haeng Lee, Hwaseong (KR); Keun Joo Park, Seoul (KR); Chang-Woo Shin, Hwaseong (KR); Jooyeon Woo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 65 days.

(21) Appl. No.: 13/921,808

(22) Filed: Jun. 19, 2013

(65) Prior Publication Data
US 2013/0335595 A1   Dec. 19, 2013

(30) Foreign Application Priority Data
Jun. 19, 2012 (KR) .................. 10-2012-0065409

(51) Int. Cl.
*H04N 5/232* (2006.01)
*G06T 7/20* (2006.01)

(52) U.S. Cl.
CPC .............. *H04N 5/23229* (2013.01); *G06T 7/20* (2013.01); *G06T 2207/10016* (2013.01)

(58) Field of Classification Search
CPC .............................. H04N 5/23229; G06T 7/20
USPC .................. 348/143, 208.14, 222.1; 382/103
See application file for complete search history.

(56) References Cited

U.S. PATENT DOCUMENTS

| 7,728,269 | B2 | 6/2010 | Lichtsteiner et al. | |
|---|---|---|---|---|
| 2007/0030342 | A1* | 2/2007 | Wilburn et al. | 348/207.11 |
| 2007/0280507 | A1 | 12/2007 | Murali | |
| 2009/0225300 | A1 | 9/2009 | Barrows et al. | |
| 2010/0053322 | A1 | 3/2010 | Marti et al. | |
| 2010/0102990 | A1* | 4/2010 | Kamioka | 348/222.1 |
| 2010/0191482 | A1* | 7/2010 | Hasson et al. | 702/49 |
| 2011/0110560 | A1 | 5/2011 | Adhikari | |
| 2012/0093360 | A1 | 4/2012 | Subramanian et al. | |
| 2012/0148094 | A1* | 6/2012 | Huang et al. | 382/103 |
| 2013/0113934 | A1* | 5/2013 | Hotta et al. | 348/143 |

OTHER PUBLICATIONS

Ryad Benosman, et al; "Asynchronous frameless event-based optical flow"; Neural Networks; vol. 27, Mar. 27, 2012; pp. 32-37.
Christoph Posch, et al; "An Asynchronous Time-based Image Sensor"; IEEE International Symposium on Circuits and Systems; May 18-21, 2008; pp. 2130-2133.

* cited by examiner

*Primary Examiner* — Gevell Selby
(74) *Attorney, Agent, or Firm* — Sughrue Mion, PLLC

(57) ABSTRACT

Provided is an event-based image processing apparatus and method, the apparatus including a sensor which senses occurrences of a predetermined event in a plurality of image pixels and which outputs an event signal in response to the sensed occurrences, a time stamp unit which generates time stamp information by mapping a pixel corresponding to the event signals to a time at which the event signals are output from the sensor, and an optical flow generator which generates an optical flow based on the time stamp information in response to the outputting of the event signals.

29 Claims, 12 Drawing Sheets

200

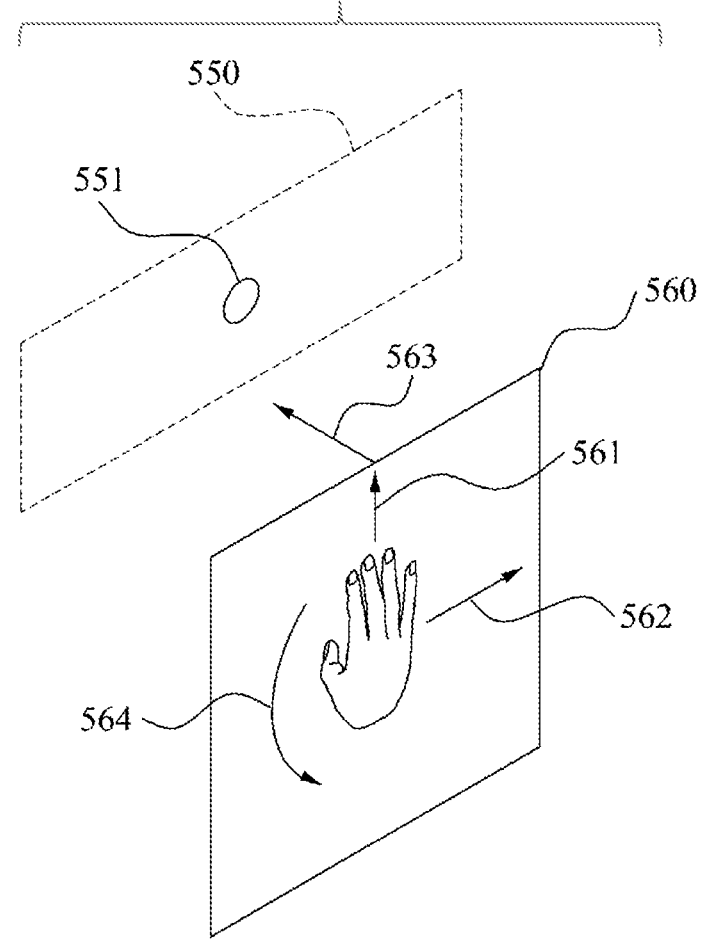

EVENT-BASED IMAGE PROCESSING APPARATUS AND METHOD

CROSS-REFERENCE TO RELATED APPLICATION

This application claims priority from Korean Patent Application No. 10-2012-0065409, filed on Jun. 19, 2012, in the Korean Intellectual Property Office, the disclosure of which is incorporated herein by reference in its entirety.

BACKGROUND

1. Field

Methods and apparatuses consistent with example embodiments relate to an event-based image processing apparatus and method.

2. Description of the Related Art

Image processing broadly refers to processing of all types of information input or output in a form of an image, and may include, for example, a task of processing a picture or a moving image, and the like. Most image processing techniques may employ a method of applying a standard signal processing technique to an image while regarding the image as a two-dimensional (2D) signal.

An image sensor refers to a device which senses input data for image processing, and may include, for example, a photoelectric conversion device corresponding to a circuit integrated using a technology for manufacturing a semiconductor device, and the like.

A line image sensor and an array image sensor are generally used. The line image sensor corresponds to a one-dimensional (1D) image sensor used for a facsimile or a copy machine, and the array image sensor corresponds to a 2D image sensor used for a television camera or a digital camera.

The line image sensor may include optical diodes disposed in a row to detect light and generate electrons. The line image sensor may scan a target object, for example, a document or a picture, in a direction perpendicular to a sensor line in order to acquire a still image of a region having an area.

The array image sensor may include optical diodes arranged two-dimensionally. Since the array image sensor may acquire the entire image of a screen at a single time, the array image sensor may be used to acquire a moving image, for example, a video.

SUMMARY

According to exemplary embodiments, there is provided an image processing apparatus, including a sensor which senses occurrences of a predetermined event in a plurality of image pixels, and which outputs an event signal in response to the sensed occurrences, a time stamp unit which generates time stamp information by mapping pixels corresponding to the event signals to a time at which the event signals are output from the sensor, and an optical flow generator which generates an optical flow based on the time stamp information in response to the outputting of the event signals by the sensor.

The optical flow may include a velocity vector of the pixel.

The optical flow generator may include a neighborhood pixel obtaining unit which obtains neighborhood pixels of the pixel, a time difference calculating unit which calculates information related to time differences between the at least one pixel and the neighborhood pixels using the time stamp information, a distance difference calculating unit which calculates information related to distance differences between the at least one pixel and the neighborhood pixels, and an optical flow calculating unit which calculates the optical flow based on the information related to the time differences and the information related to the distance differences.

The time difference calculating unit may calculate that the information related to the time differences is "0" when the time differences between the pixel and the neighborhood pixels are out of a window of a predetermined time range.

The information related to the distance differences may include inverse numbers of pixel distances between the pixel and the neighborhood pixels.

The optical flow calculating unit may calculate a two-dimensional (2D) vector A corresponding to the pixel, using the information related to the time differences and the information related to the distance differences, and perform an operation of dividing the 2D vector A by an inner product value of the 2D vector A, in order to calculate the optical flow.

The apparatus may further include an operation unit which performs an operation with respect to information for a user interface, based on the optical flow.

The information for the user interface may include at least one of a first velocity at which an object corresponding to the plurality of image pixels moves in an x-axial direction on a plane parallel to a sensor plane on which the sensor is disposed, a second velocity at which the object moves in a y-axial direction on the plane, a third velocity at which the object moves in a direction perpendicular to the plane, and a fourth velocity at which the object rotates on the plane.

The operation unit may include a plane velocity operation unit which performs an operation with respect to the first velocity and the second velocity based on the optical flow, an optical flow center operation unit which performs an operation with respect to a center of the optical flow based on the optical flow, a z-axial velocity operation unit which performs an operation with respect to the third velocity based on the optical flow and the center of the optical flow, and an angular velocity operation unit which performs an operation with respect to the fourth velocity based on the optical flow and the center of the optical flow.

The plane velocity operation unit may perform an operation with respect to an average of the optical flow, for the operation with respect to the first velocity and the second velocity.

The optical flow center operation unit may perform a center of optical flow operation, using a location of the pixel and a magnitude of a velocity vector of the pixel included in the optical flow, for the operation with respect to the center of the optical flow.

The z-axial velocity operation unit may generate a first vector corresponding to the pixel, using the center of the optical flow and a location of the pixel, and perform an inner product operation using the first vector and a velocity vector of the pixel included in the optical flow, for the operation with respect to the third velocity.

The angular velocity operation unit may generate a first vector corresponding to the pixel, using the center of the optical flow and a location of the pixel, and perform a cross product operation using the first vector and a velocity vector of the pixel included in the optical flow, for the operation with respect to the fourth velocity.

The time stamp information may include information related to a most recent time at which the predetermined event occurs in each of the plurality of image pixels.

The predetermined event may include at least one of an event of a brightness of an image pixel being increased by a value greater than or equal to a predetermined value within a unit time period, and an event of a brightness of an image pixel being decreased by the value greater than or equal to the predetermined value within the unit time period.

According to other exemplary embodiments, there may be provided an image processing method, including receiving an event signal from a sensor which senses occurrences of a predetermined event in a plurality of image pixels, generating time stamp information by mapping pixels corresponding to the event signals to a time at which the event signals are output in response to the received event signals, and generating an optical flow comprising a velocity vector of the pixels, based on the time stamp information.

The generating of the optical flow may include obtaining neighborhood pixels of the pixel, calculating information related to time differences between the pixel and the neighborhood pixels using the time stamp information, calculating information related to distance differences between the pixel and the neighborhood pixels, and calculating the optical flow based on the information related to the time differences and the information related to the distance differences.

The method may further include performing an operation with respect to information for a user interface based on the optical flow, and the information for the user interface may include at least one of a first velocity at which an object included in the plurality of image pixels moves in an x-axial direction on a plane parallel to a sensor plane on which the sensor is disposed, a second velocity at which the object moves in a y-axial direction on the plane, a third velocity at which the object moves in a direction perpendicular to the plane, and a fourth velocity at which the object rotates on the plane.

The performing may include performing an operation with respect to the first velocity and the second velocity, based on the optical flow, performing an operation with respect to a center of the optical flow, based on the optical flow, performing an operation with respect to the third velocity, based on the optical flow and the center of the optical flow, and performing an operation with respect to the fourth velocity, based on the optical flow and the center of the optical flow.

BRIEF DESCRIPTION OF THE DRAWINGS

The above and other aspects of exemplary embodiments will become apparent and more readily appreciated from the following detailed description of certain exemplary embodiments, taken in conjunction with the accompanying drawings of which:

FIG. 5B is a diagram illustrating information for a user interface generated by an operation unit according to an exemplary embodiment;

DETAILED DESCRIPTION

Figure 1:
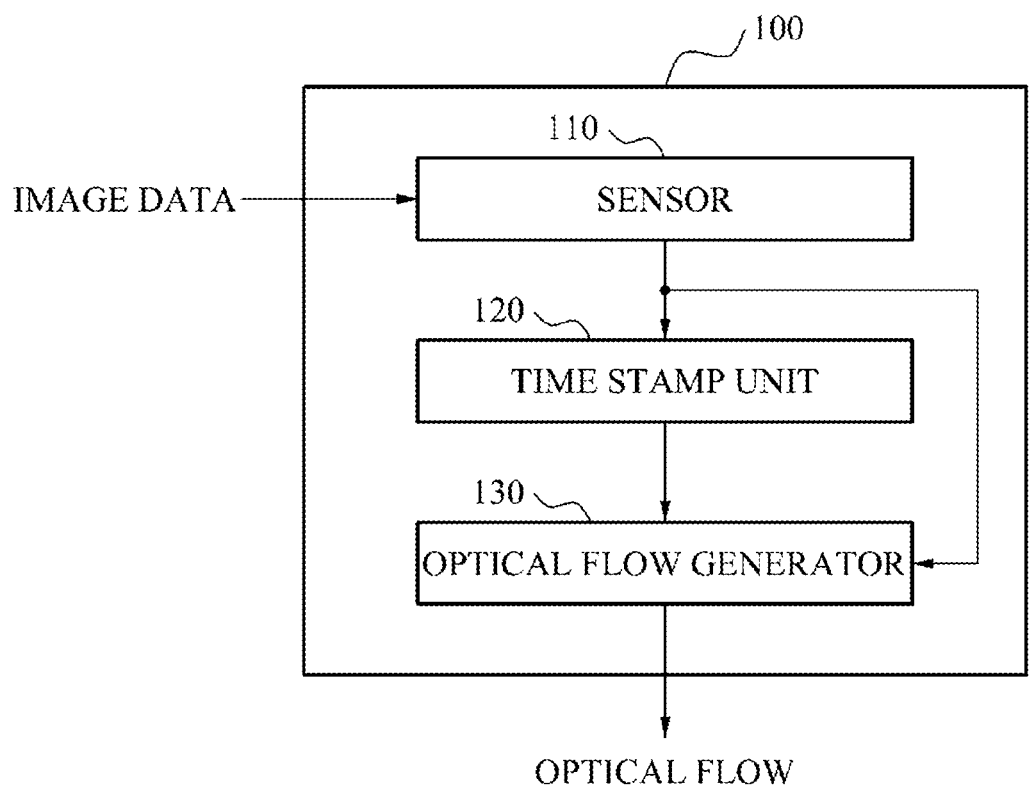
FIG. 1 is a block diagram illustrating an event-based image processing apparatus according to an exemplary embodiment.

Reference will now be made in detail to exemplary embodiments, examples of which are illustrated in the accompanying drawings, wherein like reference numerals refer to the like elements throughout. Exemplary embodiments are described below in order to explain the present disclosure by referring to the figures.

FIG. 1 is a block diagram illustrating an event-based image processing apparatus 100 according to an exemplary embodiment.

Referring to FIG. 1, the apparatus 100 includes a sensor 110, a time stamp unit 120, and an optical flow generator 130.

The sensor 110 may receive input image data successively over time. According to an exemplary embodiment, the sensor 110 may sense an occurrence of a predetermined event in each of a plurality of image pixels included in the received image data. Hereinafter, the terms pixel or pixels may refer to an image pixel or image pixels, respectively.

According to exemplary embodiments, the predetermined event may include at least one of an event which occurs when a brightness of each of the plurality of image pixels is increased by a value greater than or equal to a predetermined value within a unit time period, hereinafter also referred to as the "brightening event", and an event which occurs when a brightness of each of the plurality of image pixels is decreased by a value greater than or equal to the predetermined value within the unit time, hereinafter also referred to as the "darkening event".

For example, the sensor 110 may sense an occurrence of an event associated with a brightness of each pixel in each of the plurality of pixels included in the image data being received successively.

Accordingly, the apparatus 100 may perform image processing for pixels in which the predetermined event, for example, the event associated with the brightness of each pixel, occurs, thereby reducing a great portion of computation when compared to a scheme of performing image processing with respect to all pixels for each frame.

In addition, the sensor 110 may output an event signal when the occurrence of the predetermined event is sensed. Here, the event signal may refer to an asynchronous signal based on the predetermined event, and may include information related to at least one pixel in which the predetermined event occurs.

For example, when it is sensed that a brightness of a first pixel at (3, 10) and a brightness of a second pixel at (20, 20) are increased by a value greater than or equal to a predetermined value, the sensor 110 may output an event signal including a location of the first pixel and a location of the second pixel.

In addition, the time stamp unit 120 may receive the event signal output from the sensor 110.

The time stamp unit 120 may map at least one pixel corresponding to the event signal to a time at which the event signal is output, thereby generating time stamp information.

In particular, the time stamp unit 120 may store a time at which a new event occurs in a corresponding pixel, using information included in the received event signal, for example, information related to the at least one pixel in which the predetermined event occurs.

For example, the time stamp unit 120 may store a time at which the new event occurs in each of the plurality of pixels, based on the received event signal.

Accordingly, the time stamp information generated by the time stamp unit 120 may include information related to a most recent time at which the predetermined event occurs in each of the plurality of pixels.

According to an exemplary embodiment, the time stamp unit 120 may retain only the information related to the most recent time at which the predetermined event occurs in each of the plurality of pixels. For example, the time stamp unit 120 may update a time previously stored with respect to the corresponding pixel with the time at which the new event occurs, based on the information included in the received event signal, for example, the information related to the at least one pixel in which the predetermined event occurs. According to an exemplary embodiment, the time stamp unit 120 may be implemented as a processor or a plurality of processors, and may include one or a plurality of memory units. The time stamp unit 120 may be implemented as software, hardware, or a combination thereof. For example, according to exemplary embodiments, the time stamp unit 120 may be implemented as a Hardware Accelerator (HWA), a field programmable gate array (FPGA), and the like.

Accordingly, the apparatus 100 may perform the image processing using information related to a last (most recent) event occurring in each pixel, irrespective of a history of events having occurred over time. The apparatus 100 may therefore provide technology for performing image processing using a small amount of memory and a small amount of computation.

The time stamp information generated by the time stamp unit 120 will be further described in detail with reference to FIGS. 2A and 2B.

The optical flow generator 130 may generate an optical flow based on the time stamp information generated by the time stamp unit 120, in response to the event signal output from the sensor 110. According to an exemplary embodiment, the optical flow generator 130 may be implemented as a processor or a plurality of processors. The optical flow generator 130 may be implemented as software, hardware, or a combination thereof. For example, according to exemplary embodiments, the optical flow generator 130 may be implemented as a Hardware Accelerator (HWA), a field programmable gate array (FPGA), and the like.

According to an exemplary embodiment, the optical flow may include a velocity vector of the at least one pixel in which the new event occurs. For example, the optical flow may include a velocity vector of the at least one pixel in which the predetermined event occurs, among the plurality of pixels.

In this instance, the velocity vector may correspond to a 2D vector having a predetermined direction and a predetermined magnitude on a 2D plane including a plurality of pixels. A start location of the velocity vector may correspond to a location of a corresponding pixel.

For example, images may be acquired in temporal succession using a camera. In this instance, when a location of the camera is moved with respect to an object or when the object is moved with respect to the camera, a brightness of each pixel in an image may be changed. The optical flow may include a change in the brightness of the image in a form of a 2D vector.

A configuration of the optical flow generator 130 and an operation of the optical flow generator 130 generating the optical flow from the time stamp information will be described in detail with reference to FIG. 3.

Figure 2A:
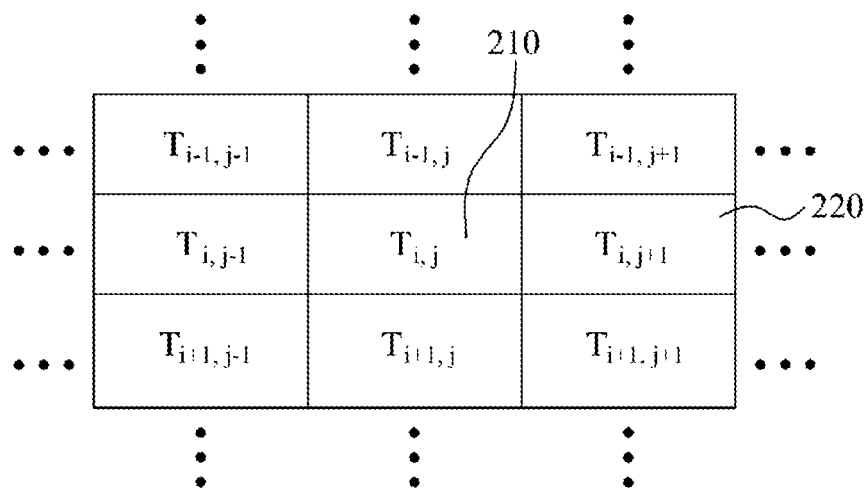
FIGS. 2A and 2B are diagrams illustrating time stamp information according to an exemplary embodiment.
Figure 2B:
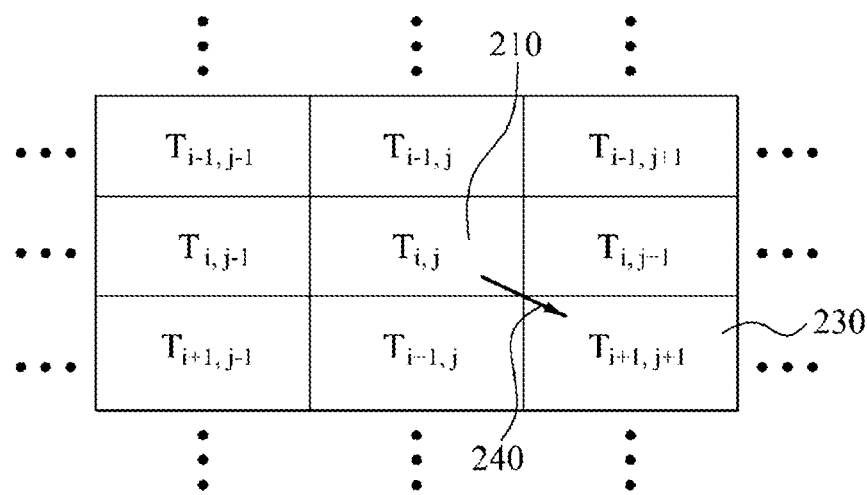

FIGS. 2A and 2B are diagrams illustrating time stamp information according to an exemplary embodiment.

Referring to FIG. 2A, time stamp information 200 may include time information corresponding to each of a plurality of image pixels.

As described with reference to FIG. 1, the time stamp information 200 may retain only information related to a most recent time at which a predetermined event occurs in each pixel.

For example, a most recent time at which the predetermined event occurs in a pixel 210 at (i, j) may be $T_{i,j}$, and a most recent time at which the predetermined event occurs in a pixel 220 at (i, j+1) may be $T_{i,j+1}$.

The time stamp unit 120 of FIG. 1 may update the time stamp information 200, based on an event signal received from the sensor 110 of FIG. 1. According to an exemplary embodiment, the time stamp unit 120 may perform the update with respect to a pixel in which the predetermined event occurs, rather than performing the update with respect to all pixels.

The sensor 110 may sense an occurrence of the predetermined event per units of time, for example, in microsecond (μs) units. In this instance, the time stamp unit 120 may store a time at which a new event occurs for each pixel, in μs units.

Referring to FIG. 2B, an event-based image processing apparatus according to an exemplary embodiment may calculate a velocity vector of at least one pixel using time stamp information, in order to generate an optical flow.

For example, a predetermined event may occur in a pixel 230 at (i+1, j+1) after the predetermined event occurs in a pixel 210 at (i, j). In this instance, the pixel 210 at (i, j) may store a time $T_{i,j}$, and the pixel 230 at (i+1, j+1) may store a time $T_{i+1,j+1}$ having a greater value than $T_{i,j}$.

In this instance, the event-based image processing apparatus may calculate a 2D vector $\vec{A}$ (not shown) having a start point at a location of the pixel 210, using the time stamp information 200.

In particular, the event-based image processing apparatus may extract a time difference and a location difference from the time stamp information 200 for calculating the 2D vector $\vec{A}$. Here, the time difference denotes a time difference between the time $T_{i,j}$ and the time $T_{i+1,j+1}$, and may correspond to a scalar $\Delta t$ (not shown). In addition, the location difference denotes a location difference between the pixel 230 and the pixel 210, and may correspond to a 2D vector $\vec{d}$ 240.

The event-based image processing apparatus may calculate the 2D vector $\vec{A}$, using Equation 1.

$$\vec{A} = \vec{d} \cdot \Delta t \frac{1}{\|\vec{d}\|^2} \qquad \text{[Equation 1]}$$

In addition, the event-based image processing apparatus may calculate 2D vectors having start points at locations of other pixels, similar to the scheme described above. The event-based image processing apparatus may output an optical flow including a set of such 2D vectors.

Figure 3:
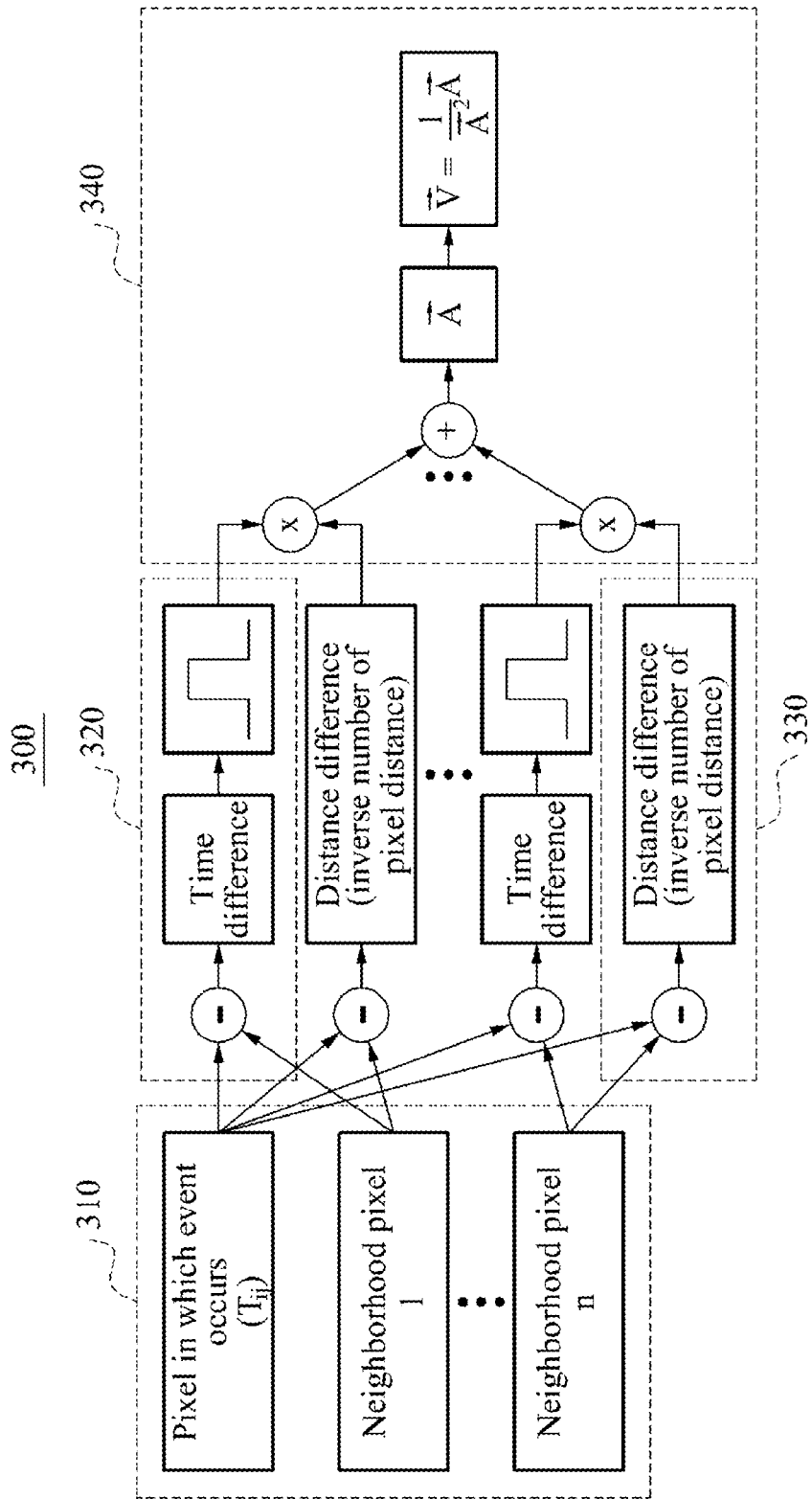
FIG. 3 is a block diagram illustrating an optical flow generator included in an event-based image processing apparatus according to an exemplary embodiment.

FIG. 3 is a block diagram illustrating an optical flow generator 300 included in an event-based image processing apparatus according to an exemplary embodiment.

Referring to FIG. 3, the optical flow generating unit 300 includes a neighborhood pixel obtaining unit 310, a time difference calculating unit 320, a distance difference calculating unit 330, and an optical flow calculating unit 340. Each of the components shown in FIG. 3 may be implemented as software, hardware, or a combination thereof. For example, according to exemplary embodiments, the neighborhood pixel obtaining unit 310, time difference calculating unit 320, distance difference calculating unit, etc. may be implemented as a Hardware Accelerator (HWA), a field programmable gate array (FPGA), and the like.

The neighborhood pixel obtaining unit 310 may obtain a plurality of neighborhood pixels of a pixel in which a predetermined event occurs.

For example, the neighborhood pixel obtaining unit 310 may obtain eight neighborhood pixels directly adjacent to the pixel in which the predetermined event occurs. According to other exemplary embodiments, the neighborhood pixel obtaining unit 310 may obtain eight neighborhood pixels directly adjacent to the pixel in which the predetermined event occurs, and additionally, sixteen neighborhood pixels surrounding the eight neighborhood pixels. It is understood that other numbers of pixels may also be obtained according to other exemplary embodiments.

In addition, the time difference calculating unit 320 may calculate information related to time differences between at least one pixel in which the predetermined event occurs and neighborhood pixels of the at least one pixel, based on the time stamp information 200 of FIGS. 2A and 2B.

In particular, the time difference calculating unit 320 may calculate time differences between a pixel in which a new event occurs and neighborhood pixels of the pixel. For example, a new event may occur in the pixel 210 of FIG. 2A. The time difference calculating unit 320 may calculate a difference between the time $T_{i,j}$ stored in the pixel 210 and the time $T_{i,j+1}$ stored in the neighborhood pixel 220.

According to an exemplary embodiment, the time $T_{i,j}$ stored in the pixel 210 may be updated by the time stamp unit 120 of FIG. 1, in response to the occurrence of the new event. Accordingly, $T_{i,j}-T_{i,j+1}$ may correspond to a value greater than or equal to "0". When the event occurs in the pixels 210 and 220 simultaneously, $T_{i,j}-T_{i,j+1}$ may correspond to a value of "0".

The time difference calculating unit 320 may calculate the time differences at the plurality of neighborhood pixels obtained by the neighborhood pixel obtaining unit 310, respectively.

In addition, the time difference calculating unit 320 may output a value of "0" in lieu of the calculated time difference, when the calculated time difference is out of a window of a predetermined range, for example, a window of 0.1 seconds (s).

In particular, when the calculated time difference is out of the window of the predetermined range, for example, 0.1 s, the time difference calculating unit 320 may treat the calculated time difference as meaningless information.

The optical flow generator 300 may remove elements acting as noise which affect a velocity vector of each pixel included in an optical flow.

In addition, the distance difference calculating unit 330 may calculate information related to distance differences between the at least one pixel in which the predetermined event occurs and the neighborhood pixels of the at least one pixel.

In particular, the distance difference calculating unit 330 may calculate inverse numbers of pixel distances between a pixel in which a new event occurs and neighborhood pixels of the pixel. Here, the pixel distances may include normalized distances among a plurality of image pixels. For example, a pixel distance between the pixel 210 and the pixel 220 of FIG. 2A may correspond to "1".

The distance difference calculating unit 330 may calculate the inverse numbers of the pixel distances at the plurality of neighborhood pixels obtained by the neighborhood pixel obtaining unit 310, respectively.

In addition, the optical flow calculating unit 340 may calculate an optical flow based on the information related to the time differences calculated by the time difference calculating unit 320 and the information related to the distance differences calculated by the distance difference calculating unit 330.

In particular, the optical flow calculating unit 340 may calculate a 2D vector A corresponding to the at least one pixel in which the predetermined event occurs, using the information related to the time differences and the information related to the distance differences, and perform an operation of dividing the 2D vector A by an inner product value of the 2D vector A, in order to calculate the optical flow.

For example, the optical flow calculating unit 340 may multiply the information related to the distance differences by the information related to the time differences, corresponding to the neighborhood pixels of the pixel in which the predetermined event occurs, respectively. The optical flow calculating unit 340 may calculate the 2D vector A using a sum of results of the multiplication corresponding to the neighborhood pixels, respectively. According to an exemplary embodiment, a unit of the 2D vector A may correspond to "time/distance".

The optical flow calculating unit 340 may calculate a velocity vector V included in the optical flow, by dividing the 2D vector A by an inner product value of the 2D vector A. According to an exemplary embodiment, a unit of the velocity vector V may correspond to "distance/time".

The optical flow calculating unit 340 may calculate the velocity vector V at each of the pixels in which the predetermined event occurs, thereby generating the optical flow including velocity vectors of the pixels, respectively.

As described above, the time difference calculating unit 320 may output a value of "0" when time differences between a pixel in which an event occurs and neighborhood pixels of the pixel are out of a window of a predetermined range. When the time differences between the pixel in which the event occurs and the neighborhood pixels of the pixel are out of the window of the predetermined range, the 2D vector A calculated by the optical flow calculating unit 340 may correspond to "0".

In this instance, the optical flow calculating unit 340 may output a value of "0" in lieu of the value infinity calculated as a value of the velocity vector V.

Although not shown in FIG. 3, the optical flow generator 300 may include at least one of a partial calculating unit and a full calculating unit.

The partial calculating unit may asynchronously calculate a new optical flow for a partial pixel and neighborhood pixels of the partial pixel, among the plurality of image pixels, in response to an output of an event signal. Here, the partial pixel may refer to a pixel for which the event signal is output. For example, the partial calculating unit may calculate velocity vectors of at least one pixel corresponding to the event signal and neighborhood pixels adjacent to the at least one pixel, among the plurality of image pixels.

In addition, the full calculating unit may calculate a new optical flow for the plurality of image pixels, at every predetermined interval. For example, the full calculating unit may determine whether a predetermined interval elapses, and calculate the velocity vectors of the plurality of image pixels in a lump when the predetermined interval elapses.

The description provided with reference to FIG. 3 may be applied identically to the partial calculating unit and the full calculating unit and thus, a detailed description will be omitted for conciseness.

Figure 4A:
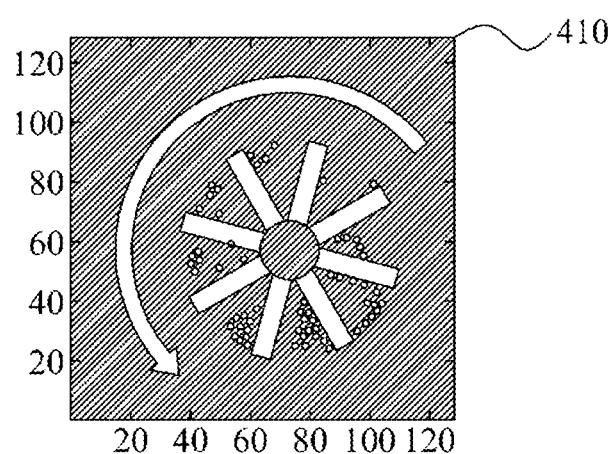
FIGS. 4A through 4C are graphs illustrating an optical flow generated by an optical flow generator according to an exemplary embodiment.
Figure 4B:
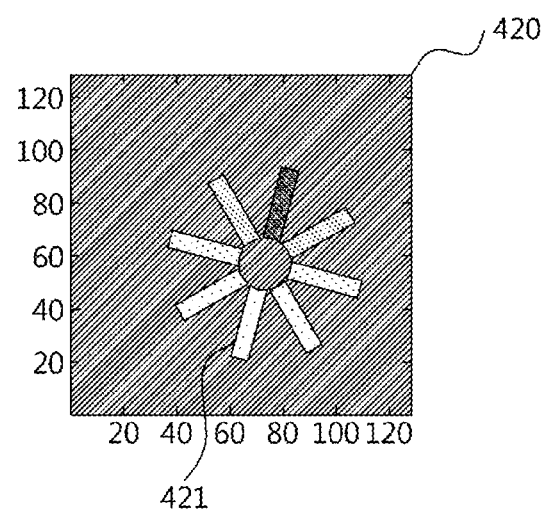
Figure 4C:
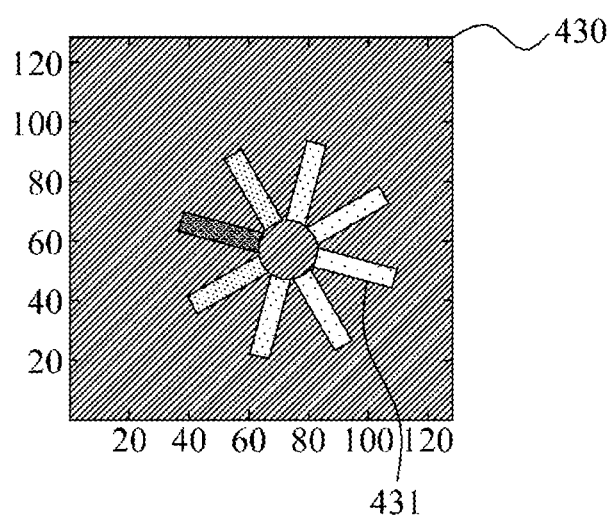

FIGS. 4A through 4C are graphs illustrating an optical flow generated by an optical flow generator according to an exemplary embodiment.

For example, eight rods disposed around a central portion of a cylinder may rotate counterclockwise at identical velocities. In this example, an event-based image processing apparatus according to an exemplary embodiment may generate an optical flow by rotational movement of the eight rods.

In particular, referring to a graph 410 of FIG. 4A, the sensor 110 of FIG. 1 may sense a brightening event and output an event signal when the eight rods disposed around the central portion of the cylinder rotate counterclockwise. In detail, the sensor 110 may sense brightnesses of each of a plurality of pixels in an image being increased by the eight rods rotating counterclockwise by a value greater than or equal to a predetermined value, and output the event signal.

As described with reference to FIG. 3, the optical flow generator 300 may calculate a velocity vector V corresponding to each of the corresponding pixels, for example, the pixels having brightnesses which are increased by the value greater than or equal to the predetermined value.

A graph 420 of FIG. 4B illustrates a result of extracting an x-axial component from the velocity vector V corresponding to a 2D vector.

In particular, the graph 420 is a graph showing a magnitude of an x-axial velocity vector Vx of each of the corresponding pixels, for example, the pixels having brightnesses which are increased by the value greater than or equal to the predetermined value, with a brightness.

For example, since the eight rods rotate counterclockwise, an x-axial velocity vector Vx of a rod 421 disposed in a lower side may have a greatest value. Accordingly, the rod 421 may be displayed as the brightest rod.

In addition, a graph 430 of FIG. 4C illustrates a result of extracting a y-axial component from the velocity vector V corresponding to a 2D vector.

In particular, the graph 430 is a graph showing a magnitude of a y-axial velocity vector Vy of each of the corresponding pixels, for example, the pixels of which brightnesses are increased by the value greater than or equal to the predetermined value, with a brightness.

For example, since the eight rods rotate counterclockwise, a y-axial velocity vector Vy of a rod 431 disposed in a right side may have a greatest value. Accordingly, the rod 431 may be displayed as the brightest rod.

Figure 5A:
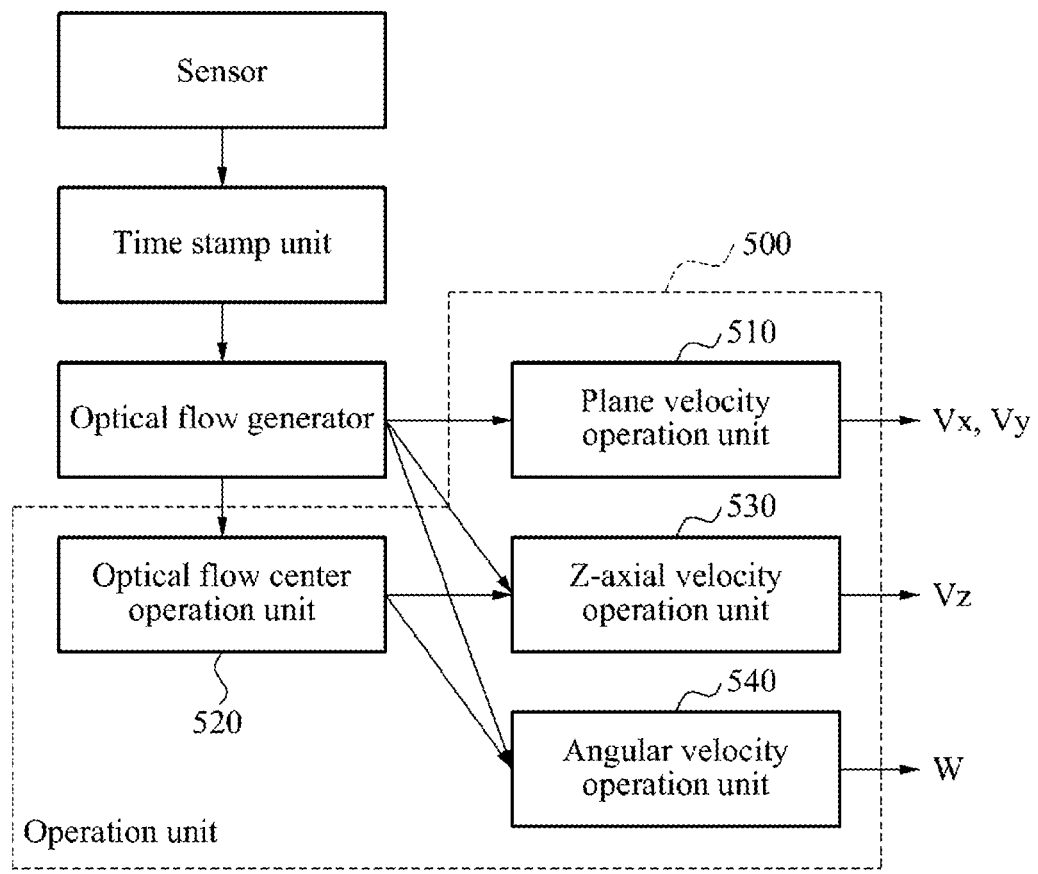
FIG. 5A is a block diagram illustrating an operation unit included in an event-based image processing apparatus according to an exemplary embodiment.

FIG. 5A is a block diagram illustrating an operation unit 500 included in an event-based image processing apparatus according to an exemplary embodiment.

Referring to FIG. 5A, the event-based image processing apparatus according to exemplary embodiments may further include the operation unit 500.

The operating unit 500 may perform an operation with respect to information for a user interface, based on an optical flow generated by an optical flow generator.

Referring to FIG. 5B, the information for the user interface may include at least one of a first velocity Vx at which an object included in (e.g., corresponding to) a plurality of image pixels moves in an x-axial direction 562 on a plane 560 parallel to a sensor plane 550 on which a sensor 551 is disposed, a second velocity Vy at which the object moves in a y-axial direction 561 on the plane 560 parallel to the sensor plane 550, a third velocity Vz at which the object moves in a direction 563 perpendicular to the plane 560 and the sensor plane 550, and a fourth velocity ω at which the object rotates in a counterclockwise direction 564 on the plane 560 parallel to the sensor panel 550.

According to other exemplary embodiments, the operation unit 500 may generate the information for the user interface when a camera moves while an object is static. In this instance, a person having ordinary skill in the art may modify the exemplary embodiments described above to generate the information for the user interface for the case in which the camera moves while the object is static, using a simple operation, for example, an operation of changing a sign of a resulting value.

In this instance, the operation unit 500 may include a plane velocity operation unit 510, an optical flow center operation unit 520, a z-axial velocity operation unit 530, and an angular velocity operation unit 540.

The plane velocity operation unit 510 may perform an operation with respect to the first velocity Vx and the second velocity Vy, based on an optical flow. In particular, the plane velocity operation unit 510 may perform an operation with respect to an average of the optical flow, for the operation with respect to the first velocity Vx and the second velocity Vy.

As described above, the optical flow may include a velocity vector of at least one pixel in which a predetermined event occurs. The plane velocity operation unit 510 may perform the operation with respect to the average of the optical flow, by calculating a sum of all velocity vectors of the at least one pixel.

According to an exemplary embodiment, each of the velocity vectors of the at least one pixel may correspond to a 2D vector and thus, the average of the optical flow may also correspond to a 2D vector. The plane velocity operation unit 510 may separate an x-axial component and a y-axial component from the calculated average of the optical flow, thereby performing the operation with respect to the first velocity Vx and the second velocity Vy.

In addition, the optical flow center operation unit 520 may perform an operation with respect to a center of the optical flow, based on the optical flow. In particular, the optical flow center operation unit 520 may perform a center of optical flow operation, using a location of the at least one pixel in which the predetermined event occurs, and a magnitude of a velocity vector of the corresponding pixel included in the optical flow, for the operation with respect to the center of the optical flow.

Figure 6:
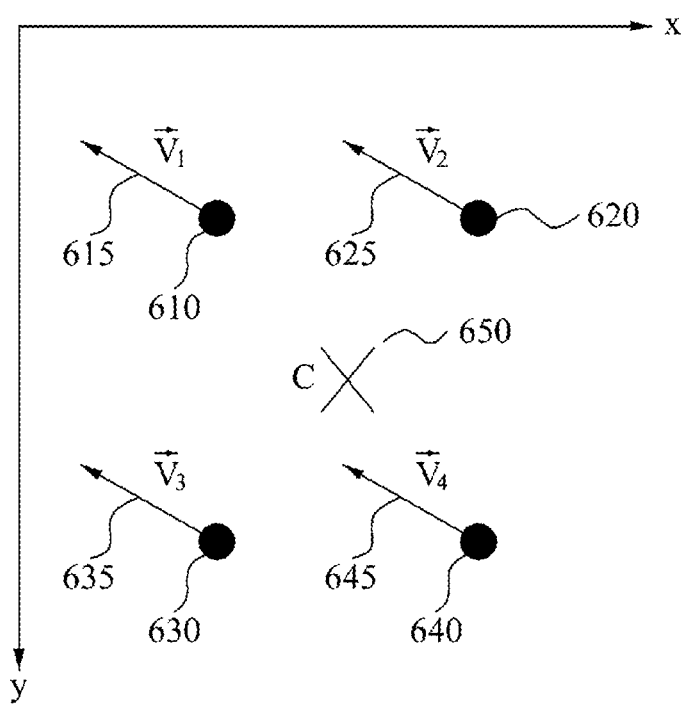
FIG. 6 is a diagram illustrating a method of performing an operation with respect to a center of an optical flow according to an exemplary embodiment.

For example, referring to FIG. 6, the predetermined event may occur in pixels 610 through 640. In this instance, an optical flow generated by the optical flow generator may include a velocity vector $V_1$ 615 corresponding to the pixel 610, a velocity vector $V_2$ 625 corresponding to the pixel 620, a velocity vector $V_3$ 635 corresponding to the pixel 630, and a velocity vector $V_4$ 645 corresponding to the pixel 640.

The optical flow center operation unit 520 may perform an operation with respect to a center c 650 of the optical flow by substituting locations, for example, an x-axial pixel coordinate and a y-axial pixel coordinate, of the pixels 610 through 640, and by substituting magnitudes, for example, a magnitude in an x-axial direction and a magnitude in a y-axial direction, of the velocity vectors $V_1$ 615 through $V_4$ 645 into Equation 2.

$$c = \left( \frac{\sum_i |V_{xi}| x_i}{\sum_i |V_{xi}|}, \frac{\sum_i |V_{yi}| y_i}{\sum_i |V_{yi}|} \right) \quad \text{[Equation 2]}$$

In addition, the z-axial velocity operation unit 530 may perform an operation with respect to the third velocity Vz, based on the optical flow and the center of the optical flow.

In particular, the z-axial velocity operation unit 530 may generate a first vector corresponding to the at least one pixel using the center of the optical flow and a location of the at least one pixel in which the predetermined event occurs. In addition, the z-axial velocity operation unit 530 may perform an inner product operation using the first vector and a velocity vector of the corresponding pixel included in the optical flow, for the operation with respect to the third velocity Vz.

Figure 7:
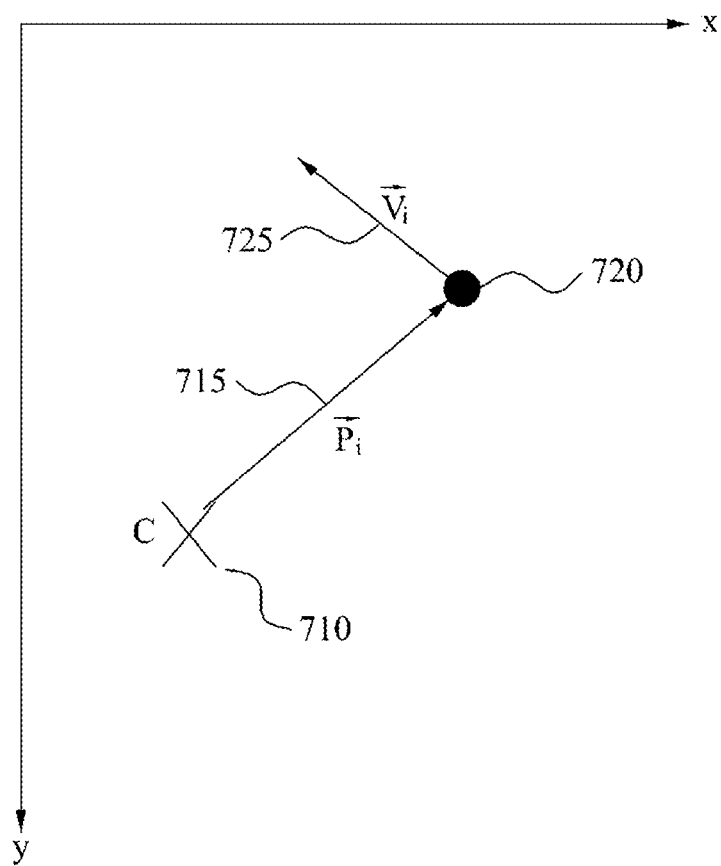
FIG. 7 is a diagram illustrating a method of performing an operation with respect to a z-axial velocity and an angular velocity according to an exemplary embodiment.

For example, referring to FIG. 7, C 710 denotes the center of the optical flow calculated by the optical flow center operation unit 520 of FIG. 5A, and a pixel 720 denotes an $i^{th}$ pixel among the pixels in which the predetermined event occurs.

The z-axial velocity operation unit 530 may generate a first vector 715 using a location of C 710 and a location of the pixel 720. In addition, the z-axial velocity operation unit 530 may perform the operation with respect to the third velocity Vz, by substituting the first vector 715 and a velocity vector 725 of the $i^{th}$ pixel 720 into Equation 3.

$$V_z = \sum_i \vec{p}_i \cdot \vec{V}_i \quad \text{[Equation 3]}$$

Referring to FIG. 5B, when the object moves in the direction 563 to be close to the sensor 551, the third velocity Vz calculated by the z-axial velocity operation unit 530 may have a positive (+) value. Conversely, when the object moves in a direction to be away from the sensor 551, the third velocity Vz may have a negative (−) value.

In addition, the angular velocity operation unit 540 may perform an operation with respect to the fourth velocity ω, based on the optical flow and the center of the optical flow.

In particular, the angular velocity operation unit 540 may generate a first vector corresponding to the at least one pixel, using the center of the optical flow and a location of the at least one pixel in which the predetermined event occurs. In addition, the angular velocity operation unit 540 may perform a cross product operation using the first vector and a velocity vector of the corresponding pixel included in the optical flow, for the operation with respect to the fourth velocity ω.

For example, referring to FIG. 7, C 710 denotes the center of the optical flow calculated by the optical flow center operation unit 520 of FIG. 5A, and the pixel 720 denotes an $i^{th}$ pixel among the pixels in which the predetermined event occurs.

The angular velocity operation unit 540 may generate a first vector 715 using a location of C 710 and a location of the pixel 720. In addition, the angular velocity operation unit 540 may perform the operation with respect to the fourth velocity ω, by substituting the first vector 715 and a velocity vector 725 of the $i^{th}$ pixel 720 into Equation 4.

$$\omega = \sum_i \vec{p}_i \cdot \vec{V}_i \quad \text{[Equation 4]}$$

Referring to FIG. 5B, when the object rotates in the counterclockwise direction 564, the fourth velocity ω calculated by the angular velocity operation unit 540 may have a positive (+) value. Conversely, when the object rotates in a clockwise direction, the fourth velocity ω calculated by the angular velocity operation unit 540 may have a negative (−) value.

Thus, according to exemplary embodiments, an event-based image processing apparatus includes the technical feature of an event-based image sensor. The event-based image sensor may generate event information asynchronously in each of the plurality of pixels included in the image. As an example, the event-based image sensor included in the event-based image processing apparatus may generate event information in response to a pixel in which a predetermined event occurs, among a plurality of pixels. As a result, the event-based image processing apparatus may reduce an amount of time required for updating image information in order to generate an optical flow using the event-based image sensor. For example, the event-based image processing apparatus may update a time stamp with respect to the pixel in which a predetermined event occurs, without having to scan an entire image on a frame by frame basis. As a result, exemplary embodiments provide a technique for significantly reducing an amount of computation time and memory space necessary for generating an optical flow.

Figure 8:
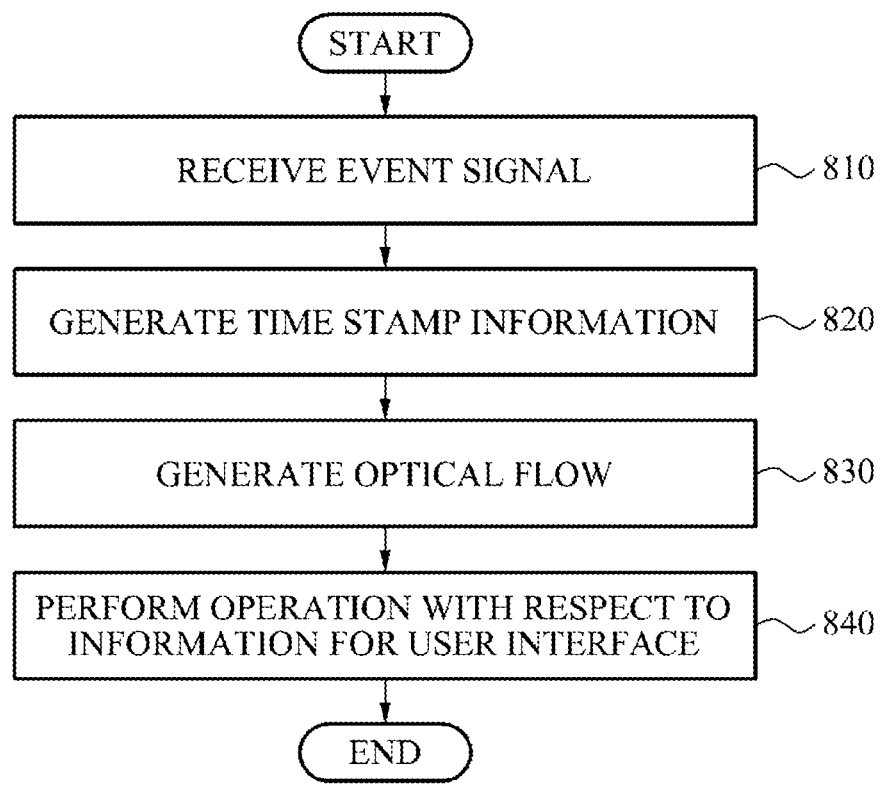
FIG. 8 is a flowchart illustrating an event-based image processing method according to an exemplary embodiment.

FIG. 8 is a flowchart illustrating an event-based image processing method according to an exemplary embodiment.

Referring to FIG. 8, the event-based image processing method of FIG. 8 includes operation 810 of receiving an event signal, operation 820 of generating time stamp information, operation 830 of generating an optical flow, and operation 840 of performing an operation with respect to information for a user interface.

In operation 810, an event signal may be received from a sensor sensing an occurrence of a predetermined event in each of a plurality of image pixels. In operation 820, the time stamp information may be generated by mapping at least one pixel corresponding to the event signal to a time at which the event signal is output, in response to the received event signal. In operation 830, an optical flow including a velocity vector of the at least one pixel may be generated based on the time stamp information. In operation 840, the information for the user interface may be calculated based on the optical flow.

The description provided with reference to FIGS. 1 through 7 may be applied identically to the operations of FIG. 8 and thus, a detailed description will be omitted for conciseness.

The method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as machine code produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An image processing apparatus, comprising:
   a sensor which senses an occurrence of a predetermined event associated with a change in a brightness of one image pixel among a plurality of image pixels, and which outputs an event signal including location information of the one image pixel in response to the sensed occurrence;
   a time stamp unit which generates time stamp information by mapping a pixel corresponding to the event signal to a time at which the event signal is output from the sensor, wherein the pixel corresponding to the event signal is determined based on the location information; and
   an optical flow generator which generates an optical flow based on the time stamp information.

2. The apparatus of claim 1, wherein the optical flow comprises a velocity vector of the pixel.

3. The apparatus of claim 1, wherein the optical flow generator comprises:
   a neighborhood pixel obtaining unit which obtains neighborhood pixels of the pixel;
   a time difference calculating unit which calculates information related to time differences between the pixel and the neighborhood pixels, using the time stamp information;
   a distance difference calculating unit which calculates information related to distance differences between the pixel and the neighborhood pixels; and
   an optical flow calculating unit which calculates the optical flow based on the information related to the time differences and the information related to the distance differences.

4. The apparatus of claim 3, wherein the time difference calculating unit calculates that the information related to the time differences is "0" when the time differences between the pixel and the neighborhood pixels are out of a window of a predetermined time range.

5. The apparatus of claim 3, wherein the information related to the distance differences comprises inverse numbers of pixel distances between the pixel and the neighborhood pixels.

6. The apparatus of claim 3, wherein the optical flow calculating unit calculates a two-dimensional (2D) vector A corresponding to the pixel, using the information related to the time differences and the information related to the distance differences, and performs an operation of dividing the 2D vector A by an inner product value of the 2D vector A, in order to calculate the optical flow.

7. The apparatus of claim 1, further comprising:
   an operation unit which performs an operation with respect to information for a user interface, based on the optical flow.

8. The apparatus of claim 7, wherein the information for the user interface comprises at least one of:
   a first velocity at which an object corresponding to the plurality of image pixels moves in an x-axial direction on a plane parallel to a sensor plane on which the sensor is disposed;
   a second velocity at which the object moves in a y-axial direction on the plane;
   a third velocity at which the object moves in a direction perpendicular to the plane; and
   a fourth velocity at which the object rotates on the plane.

9. The apparatus of claim 8, wherein the operation unit comprises:
   a plane velocity operation unit which performs an operation with respect to the first velocity and the second velocity, based on the optical flow;
   an optical flow center operation unit which performs an operation with respect to a center of the optical flow, based on the optical flow;
   a z-axial velocity operation unit which performs an operation with respect to the third velocity, based on the optical flow and the center of the optical flow; and
   an angular velocity operation unit which performs an operation with respect to the fourth velocity, based on the optical flow and the center of the optical flow.

10. The apparatus of claim 9, wherein the plane velocity operation unit performs an operation with respect to an average of the optical flow, for the operation with respect to the first velocity and the second velocity.

11. The apparatus of claim 9, wherein the optical flow center operation unit performs a center of optical flow operation, using a location of the pixel and a magnitude of a velocity vector of the pixel included in the optical flow, for the operation with respect to the center of the optical flow.

12. The apparatus of claim 9, wherein the z-axial velocity operation unit generates a first vector corresponding to the one pixel, using the center of the optical flow and a location of the pixel, and performs an inner product operation using the first vector and a velocity vector of the pixel included in the optical flow, for the operation with respect to the third velocity.

13. The apparatus of claim 9, wherein the angular velocity operation unit generates a first vector corresponding to the pixel, using the center of the optical flow and a location of the pixel, and performs a cross product operation using the first vector and a velocity vector of the pixel included in the optical flow, for the operation with respect to the fourth velocity.

14. The apparatus of claim 1, wherein the time stamp information comprises information related to a most recent time at which the predetermined event occurs in each of the plurality of image pixels.

15. The apparatus of claim 1, wherein the predetermined event comprises at least one of:
   an event of the brightness of the one image pixel being increased by a value greater than or equal to a predetermined value within a unit time period; and
   an event of the brightness of the one image pixel being decreased by the value greater than or equal to the predetermined value within the unit time period.

16. The image processing apparatus of claim 1, wherein the sensor asynchronously outputs an event signal corresponding to a portion of pixels in which the predetermined event occurs, among the plurality of image pixels.

17. The image processing apparatus of claim 1, wherein the optical flow generator comprises at least one of:
   a partial calculating unit which asynchronously calculates velocity vectors of at least one pixel corresponding to the predetermined event signal and neighborhood pixels adjacent to the at least one pixel, among the plurality of image pixels, in response to an output of the predetermined event signal; and
   a full calculating unit which calculates velocity vectors of the plurality of image pixels at predetermined intervals.

18. An image processing method, comprising:
   receiving an event signal from a sensor which senses an occurrence of a predetermined event associated with a change in a brightness of one image pixel among a plurality of image pixels, the event signal including location information of the one image pixel;

generating time stamp information by mapping a pixel corresponding to the event signal to a time at which the event signal is output, wherein the pixel corresponding to the event signal is determined based on the location information; and generating an optical flow comprising a velocity vector of the pixel, based on the time stamp information.

19. The method of claim 18, wherein the generating of the optical flow comprises:

obtaining neighborhood pixels of the pixel;

calculating information related to time differences between the pixel and the neighborhood pixels using the time stamp information;

calculating information related to distance differences between the pixel and the neighborhood pixels; and calculating the optical flow based on the calculated information related to the time differences and the calculated information related to the distance differences.

20. The method of claim 18, further comprising:

performing an operation with respect to information for a user interface, based on the optical flow, wherein the information for the user interface comprises at least one of:

a first velocity at which an object corresponding to the plurality of image pixels moves in an x-axial direction on a plane parallel to a sensor plane on which the sensor is disposed;

a second velocity at which the object moves in a y-axial direction on the plane;

a third velocity at which the object moves in a direction perpendicular to the plane; and a fourth velocity at which the object rotates on the plane.

21. The method of claim 20, wherein the performing comprises:

performing an operation with respect to the first velocity and the second velocity, based on the optical flow;

performing an operation with respect to a center of the optical flow, based on the optical flow;

performing an operation with respect to the third velocity, based on the optical flow and the center of the optical flow; and performing an operation with respect to the fourth velocity, based on the optical flow and the center of the optical flow.

22. A non-transitory computer-readable medium having stored thereon a program which causes a computer to execute a method comprising the operations of:

receiving an event signal from a sensor which senses an occurrence of a predetermined event, the predetermined event being an event that a brightness of one image pixel among a plurality of image pixel changes by a predetermined value or more within a unit time period;

generating time stamp information by mapping a pixel corresponding to the event signal to a time at which the event signal is output; and generating an optical flow comprising a velocity vector of the pixel, based on the time stamp information.

23. An image processor, comprising:

a sensor which receives input image data comprising a plurality of pixels, senses whether a brightness change for each of the respective pixels is greater than a preset value, and outputs respective signals only for a portion of the pixels which have the brightness change greater than the preset value, the respective signals including location information for the portion of the pixels;

a time stamper which receives the signals and generates information mapping each of the pixels in the portion of the pixels to a respective time at which the brightness change occurs based on the signals, wherein the pixels in the portion of the pixels are determined based on the location information; and an optical flow generator which generates an optical flow based on the information generated by the time stamper.

24. The image processor of claim 23, wherein the time stamper stores the information and, when a new signal is received from the sensor, updates the information and discards the previously stored information.

25. The image processor of claim 24, wherein the sensor performs a sensing operation to sense the brightness change once per microsecond (p).

26. The image processor of claim 23, wherein the optical flow comprises a velocity vector of each of the pixels in the portion of the pixels.

27. The image processor of claim 26, wherein, for a given pixel in the portion of the pixels, the velocity vector is calculated using information related to neighboring pixels which are adjacent to the given pixel.

28. The image processor of claim 27, wherein the information comprises distances between the given pixel and each of the neighboring pixels.

29. The image processor 27, wherein the information comprises time differences between the given pixel and each of the neighboring pixels.

* * * * *